INVENTOR
Benjamin F. Fitch
By Paris P. Macklin
ATTORNEYS

Feb. 18, 1930.  B. F. FITCH  1,747,765
OVERHEAD CRANE
Filed April 7, 1922   8 Sheets-Sheet 6

Feb. 18, 1930. B. F. FITCH 1,747,765
OVERHEAD CRANE
Filed April 7, 1922 8 Sheets-Sheet 7

Inventor
Benjamin F. Fitch,
By Baker & Macklin,
Att'ys.

Feb. 18, 1930.   B. F. FITCH   1,747,765
OVERHEAD CRANE
Filed April 7, 1922   8 Sheets-Sheet 8

Inventor
Benjamin F. Fitch,
By Bates & Macklin,
Attys

Patented Feb. 18, 1930

1,747,765

UNITED STATES PATENT OFFICE

BENJAMIN F. FITCH, OF EVANSTON, ILLINOIS, ASSIGNOR TO MOTOR TERMINALS COMPANY, OF WILMINGTON, DELAWARE, A CORPORATION OF DELAWARE

OVERHEAD CRANE

Application filed April 7, 1922. Serial No. 550,254.

This invention relates to hoisting and conveying apparatus and is particularly concerned with the provision of a crane which is adapted to travel on overhead tracks. Such a crane is particularly applicable in a system for handling freight, wherein the freight is stored in removable bodies or containers which may be transferred to and from automobile bodies.

In handling freight by such a system, it is desirable to adapt the apparatus to existing conditions without requiring extensive changes to be made in the structure of warehouses, platforms or runways adjacent thereto. The size of removable container which has been found to give most satisfactory results for handling freight is such, however, that the average warehouse or freight station is not constructed to receive a standard crane and to admit the containers. Accordingly, extensive shoring and bracing must be resorted to in order to strengthen existing structures and render them safe for handling loaded containers by means of an overhead crane. An additional characteristic of existing structures is the low head room which greatly hinders the use of standard size cranes.

Furthermore, the permanent construction of road beds adjacent existing platforms usually prohibits the use of individual truck slips for enabling the drivers to position their trucks accurately beneath the load engaging elements of the crane. Accordingly, other means must be similarly resorted to, for depositing a load on the truck and removing it therefrom and at the same time preventing the load from skewing laterally. In practice, this has usually been accomplished by employing crow bars for guiding the container as it enters and leaves the retaining brackets on the truck. This procedure necessitates considerable time during which the truck must remain idle and at the same time increases the danger to the workmen.

One of the objects of my invention therefore, is the provision of a crane which while possessing a minimum depth still has sufficient power to raise a loaded container from a removable body and transport it on an overhead trackway to and from the truck; whereby the crane may be satisfactorily used in existing warehouses or freight stations and still permit sufficient clearance for transporting a container across a platform. In addition, my invention contemplates the provision of a crane which is so designed that the load engaging elements may be skewed or twisted, and thereby brought into registration with those on the load, so that the load may be lifted vertically from its support, or deposited thereon, without necessitating the use of guiding tools.

To this end, I employ a hoisting crane wherein the hoisting apparatus and mechanism for moving the crane is entirely within planes passing through the top and bottom of the frame members. The necessary power for raising a loaded container is obtained by employing a screw and nut couple which controls the operation of hoisting cables and enables a load to be raised or lowered without requiring the use of hoisting drums. The means for skewing the load is so arranged that the operator may control the lateral position of the load engaging elements, and the particular embodiment shown herein for accomplishing this is illustrated, described, and claimed, in Patent No. 1,437,967 issued to me December 5th, 1922.

The means for carrying out my invention will be more fully set forth in the following description, which pertains to the drawings, and the essential characteristics of my invention will be summarized in the claims.

Figures 11, 18:
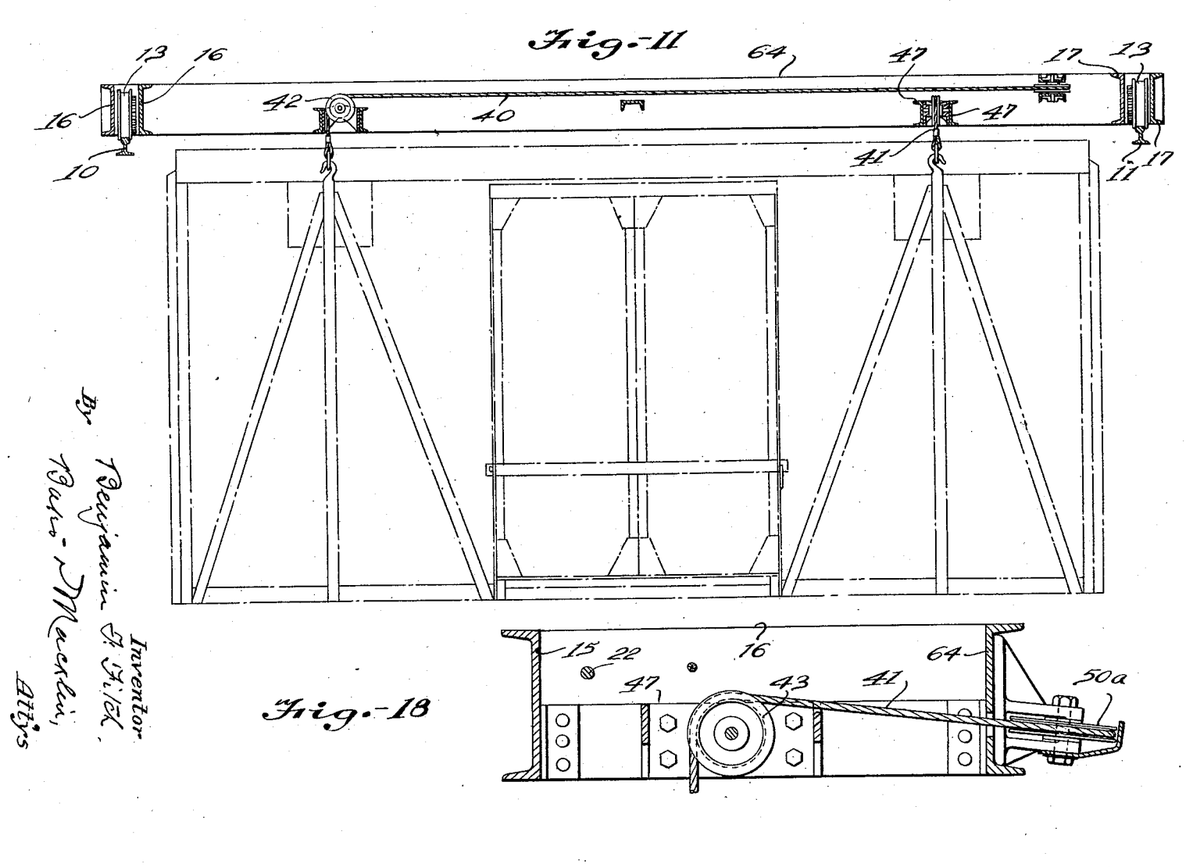
Fig. 11 is a section taken longitudinally through the modified form of crane shown in Fig. 10.
Fig. 18 is a section taken on the line 18—18 in Fig. 10.
Figure 12:
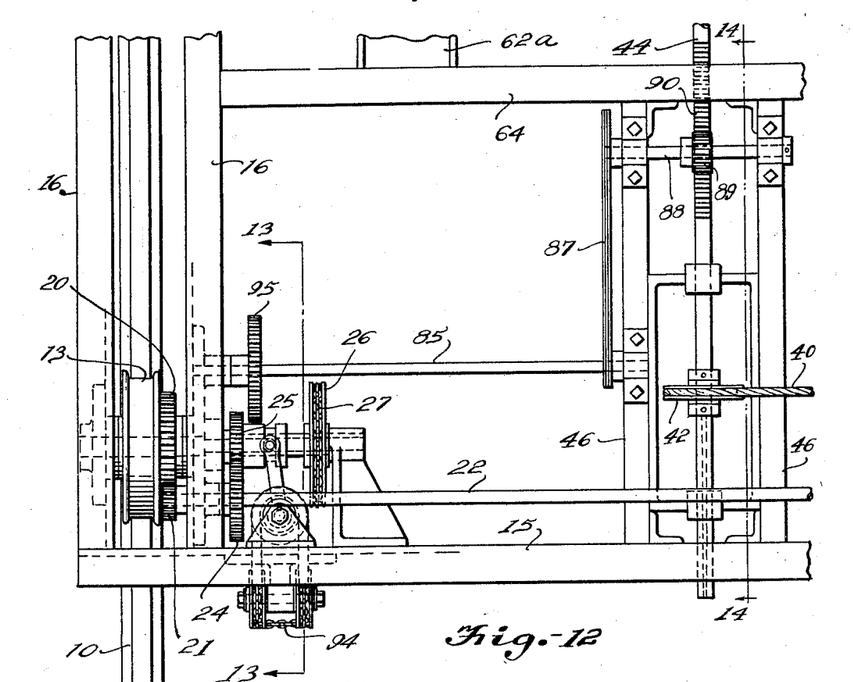
Fig. 12 is a plan view on an enlarged scale of a portion of the modified crane showing the mechanism for moving the crane and shifting the load.
Figure 13:
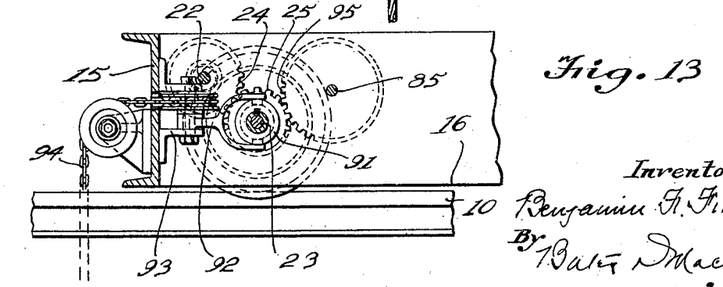
Figs. 13 and 14 are sections taken on the lines 13—13 and 14—14 respectively in Fig 12.
Figure 14:
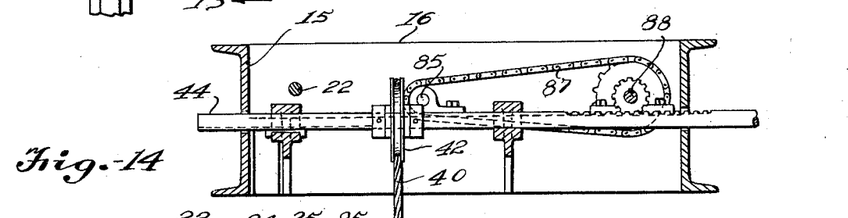
Figures 15, 16:
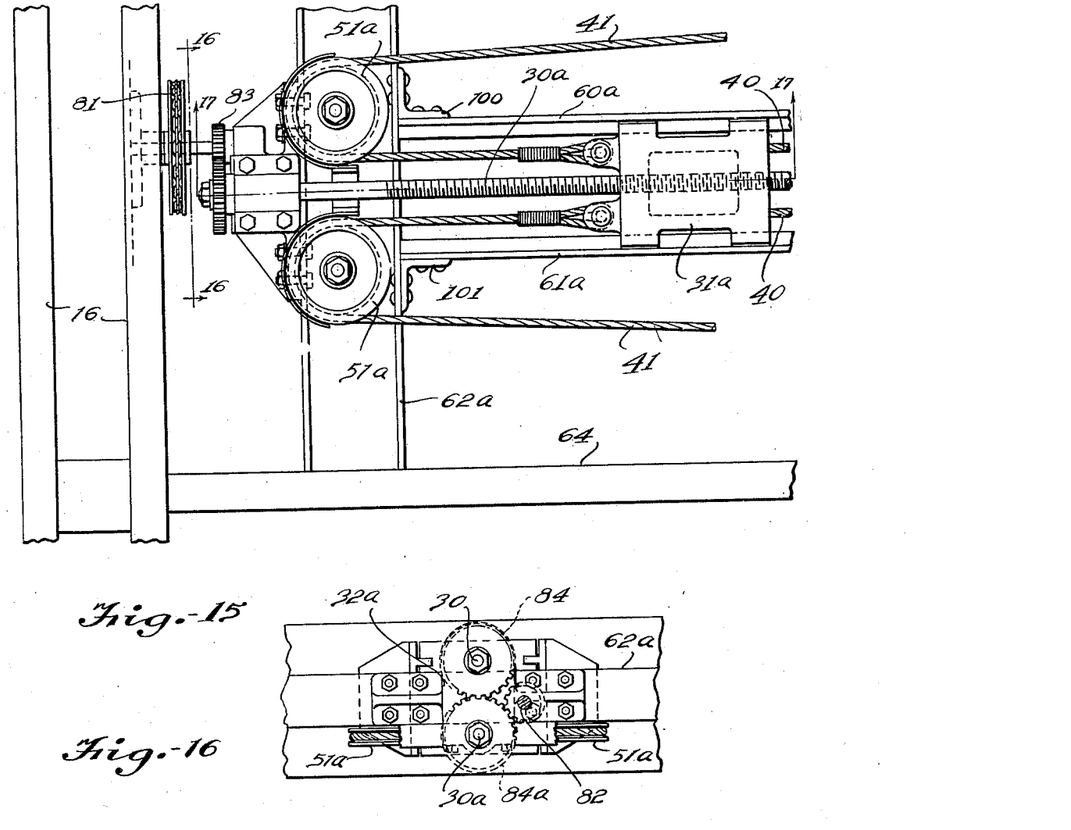
Fig. 15 is a bottom view of a portion of the modified form of crane showing the mechanism for operating the cables.
Figs. 16 and 17 are sections taken on the line 16—16 and 17—17 respectively in Fig. 15.

Designating the parts shown in the drawings by the use of reference characters, 10 and 11 indicate overhead rails which are adapted to support wheels 12 and 13 adjacent the four corners of a crane embodying my invention. The wheels of this crane, as shown in Fig. 11, are sligthly less in diameter than the depth of the frame members of which the crane is constructed. These wheels may be supported adjacent the corners of the frame formed by longitudinal members which are indicated at 14 and 15 and by transverse members, as at 16 and 17, respectively. These members are shown as channel beams all having the same depth. The wheels are arranged to be rotated for moving the crane along a trackway, and the power for causing such movement may be transmitted through the gear 20 and pinion 21, from a shaft 22, which in turn is adapted to be operated through a gear 24 and pinion 25 by a drive shaft 23. For hand operation, a chain wheel 26 may be mounted on the drive shaft, and be provided with a chain 27 which extends over the wheel and downwardly so as to be within reach of an operator. In the embodiment shown, the wheels 13 are adapted to be simultaneously actuated by a shaft 22 which extends the entire length of the crane. For this purpose a pinion 21 is mounted at each end of the shaft for driving the gears 20 carried by the respective crane supporting wheels 13.

Figure 9:
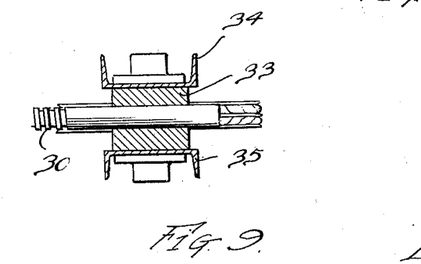
Fig. 9 is a section on an enlarged scale through the bearing block which supports the free end of the driving screw.
Figure 10:
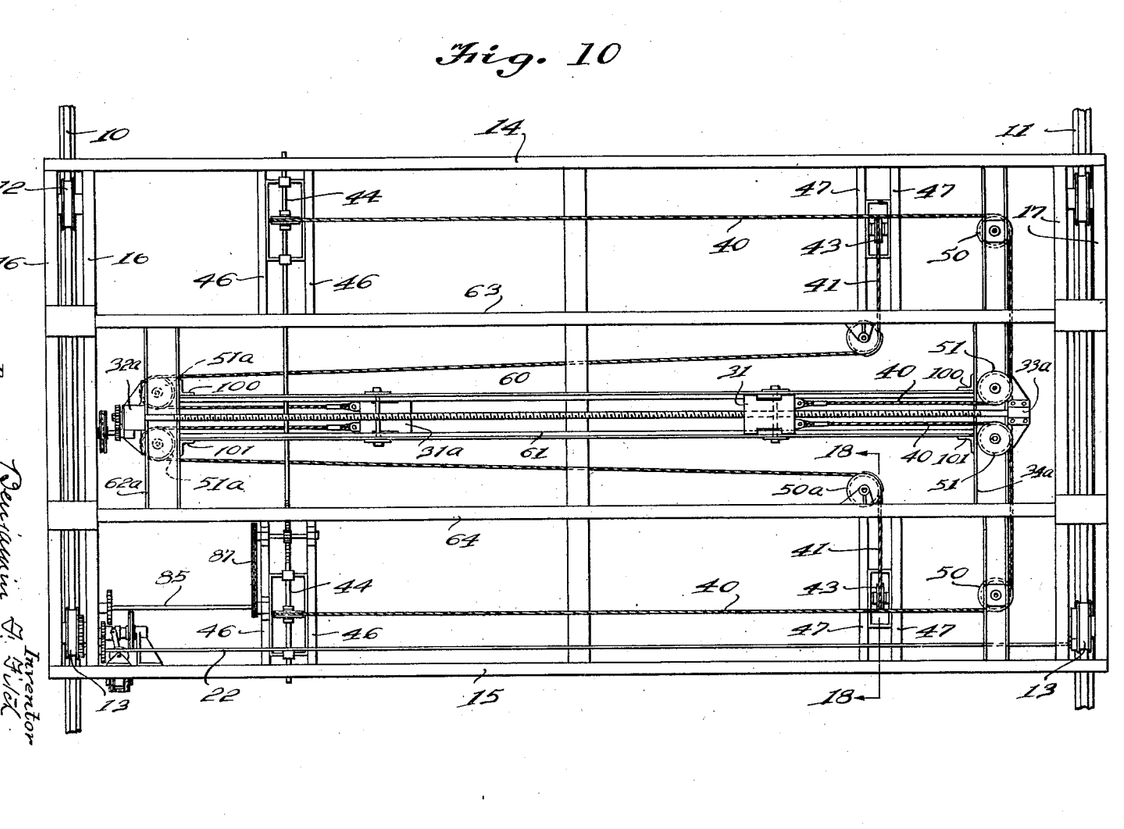
Fig. 10 is a plan view of a crane having a modified form of operating mechanism for raising the hoisting cables.

For enabling the hoisting cables to be raised and lowered without the use of hoisting drums, I have shown a screw and nut couple as embodied in a threaded shaft 30 and a nut 31 which is adapted to be moved thereby. The shaft extends longitudinally of the frame and is adapted to be supported at the driving end by a bearing, indicated generally at 32, which absorbs the radial and end thrusts and places the shaft in tension rather than in compression. The free end of the shaft, as indicated in Fig. 9, is supported in a bearing block 33 between the transverse bracket plates 34 and 35, at the top and bottom thereof respectively.

Figure 1:
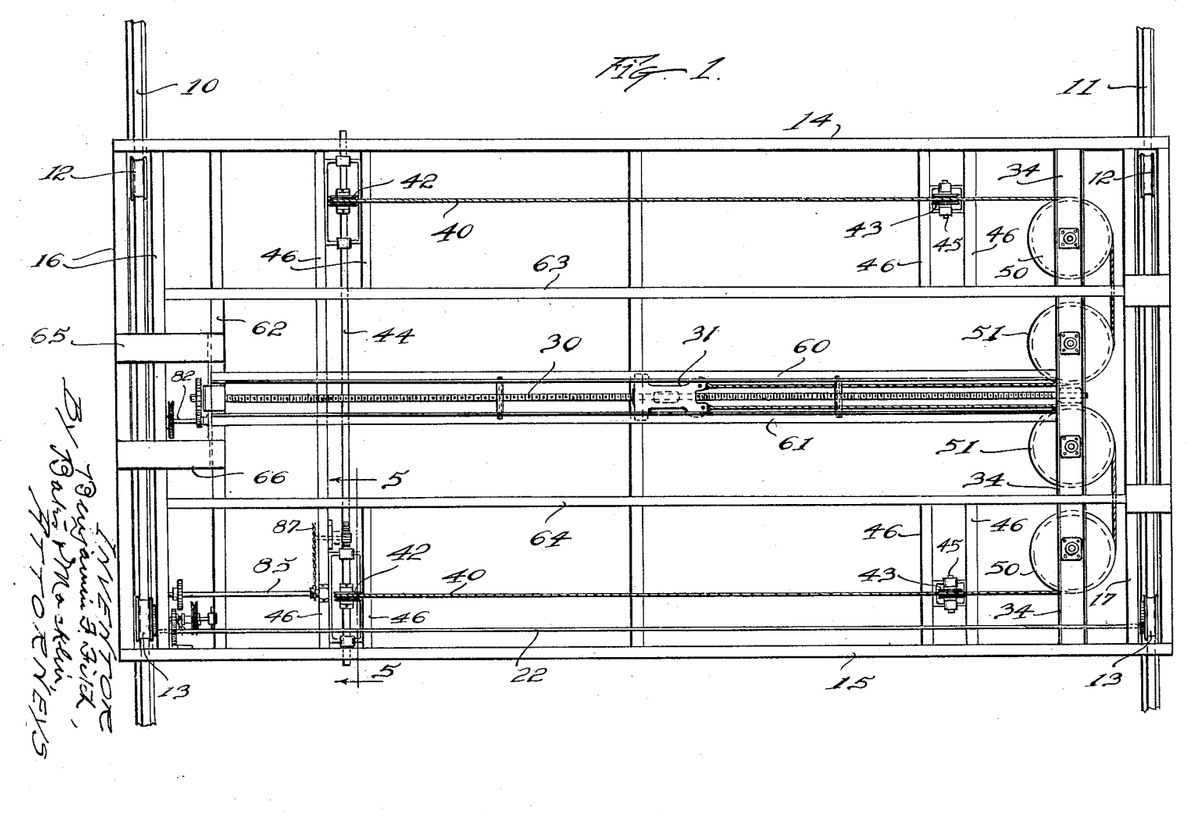
Fig. 1 is a plan view of a crane embodying my invention.
Figure 2:
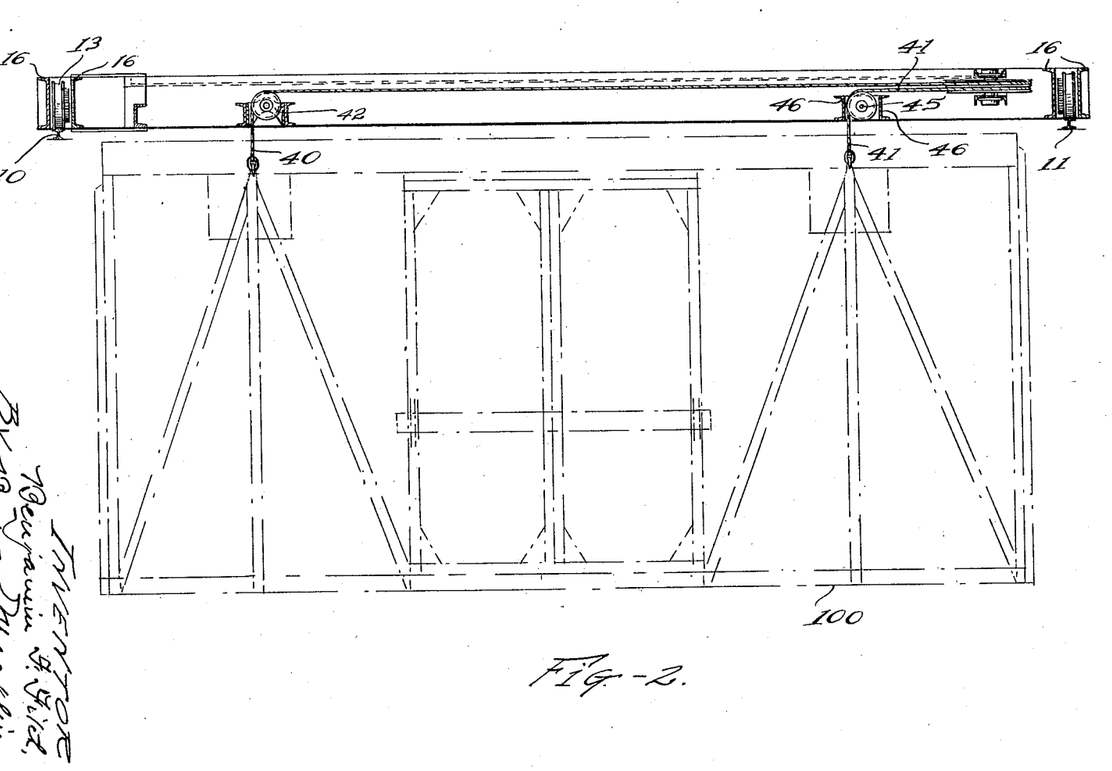
Fig. 2 is a section taken longitudinally through the crane shown in Fig. 1 and indicating diagrammatically a container attached to the hoisting cables.
Figures 3, 4:
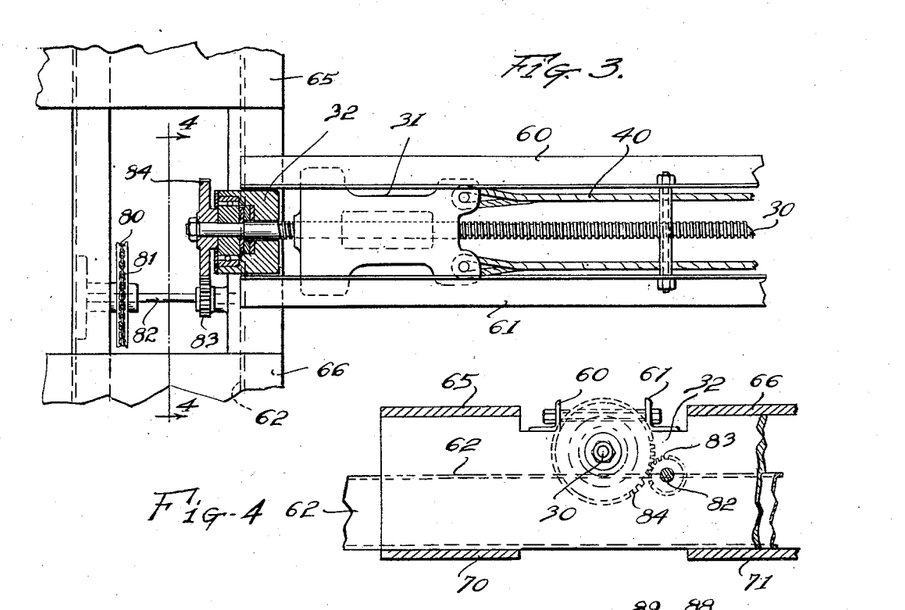
Fig. 3 is a plan view on an enlarged scale showing the bearing construction in section.
Fig. 4 is a transverse section taken on the lines 4—4 in Fig. 3.

The hoisting cables which are adapted to be actuated by the nut are shown as four in number and are indicated at 40 and 41 respectively; the cables indicated at 40 being adapted to engage one end of the load, and those at 41 adapted to engage the other end of the load, as indicated in Fig. 2. Each cable extends over sheaves 42 and 43 which are positioned on the frame so that the cables may register with the load engaging portions on the load to be raised. In Fig. 1, the sheaves 42 are shown as mounted on a transverse shaft 44, while the sheaves 43 are shown as supported on individual shafts 45, between the transverse struts 46 and 47 respectively. Each cable passes over guiding sheaves 50 and 51 which are positioned horizontally between the bracket plates 34 and 35 and are so arranged that the stress set up by the load is transmitted to the shaft 30 longitudinally thereof. Each guide shaft is double grooved; the upper grooves being used for the cables 40 and the bottom grooves for the cables 41, as indicated particularly in Fig. 2.

To guide the nut 31 as it moves along the shaft, I have shown a pair of angle members 60 and 61 which extend longitudinally of the frame and are parallel to each other throughout their length. The ends of the members 60 and 61 adjacent the driving end of the shaft may be carried by a transverse beam 62 which extends between the reinforcing beams 63 and 64. These reinforcing beams are preferably the same depth as the frame beams and are so positioned with relation to the driving shaft and hoisting cables, that the load stresses are resisted by one-piece beams, as indicated particularly in Fig. 1. The bending movement exerted by the load upon the transverse beam 62 may be further resisted by reinforcing plates 65 and 66 which extend across the beams 16 and 62, respectively, and are rigidly secured thereto. Similar plates 70 and 71 may be secured to the bottom of the beam 62 and the inner transverse beam 16. The guide members 60 and 61 then resist the torque while the frame construction resists the bending movement and lateral stresses.

The means for operating the shaft 30 is shown as a hand chain 80 which extends over the wheel 81 on a shaft 82. This shaft carries a pinion 83 which meshes with a gear 84 rigid with the drive shaft 30.

Figure 5:
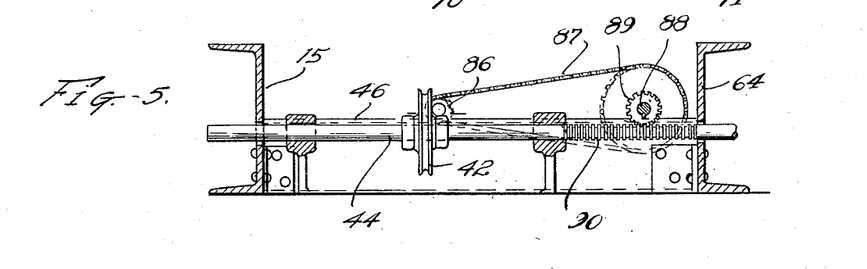
Fig. 5 is a section on an enlarged scale taken on the lines 5—5 in Fig. 1.
Figure 6:
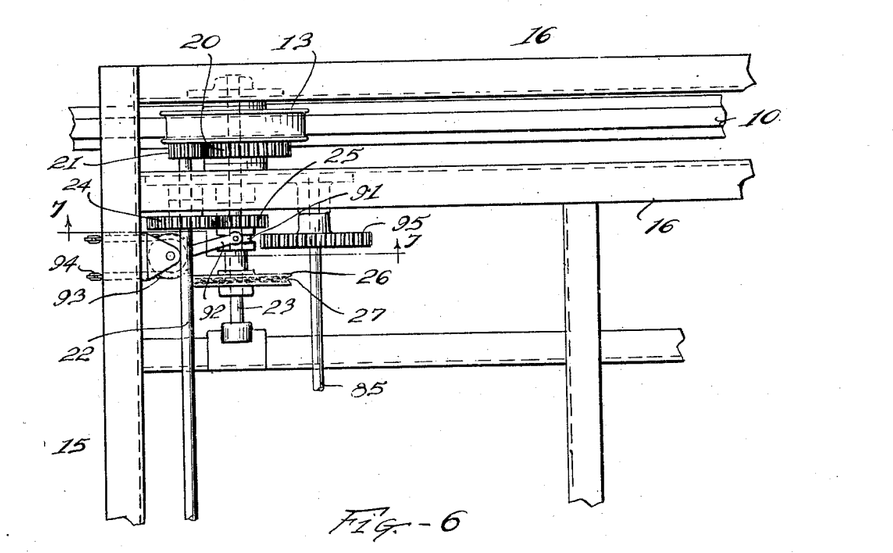
Fig. 6 is a plan view showing on an enlarged scale, the construction of some of the operating mechanism.
Figure 7:
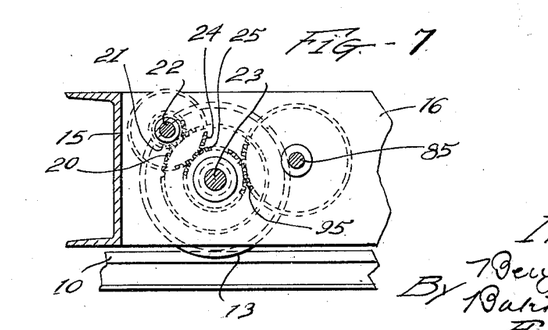
Fig. 7 is a section taken on the line 7—7 in Fig. 6.
Figure 8:
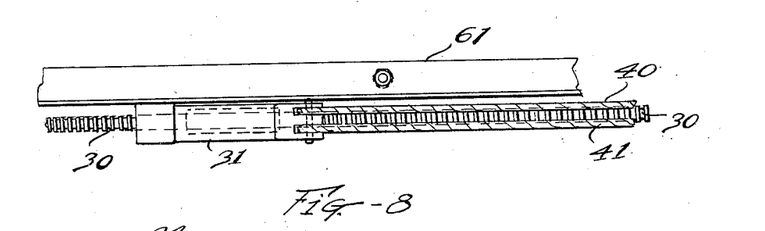
Fig. 8 is an elevation showing the relation between the nut and guiding means therefor.

In order to bring the load engaging members on the ends of the cables into proper position for engaging a load, I prefer to provide mechanism which may be actuated by one of the hand chains previously mentioned. In Figs. 1 and 6, I have shown the hand chain 27 as being adapted to operate the skewing mechanism. To attain this, I arrange a pinion 25 so that it is loosely mounted on the shaft 23 and is provided with a shipper collar 91 which is adapted to be engaged by a shipper lever 92. This lever 92 may be supported on a bracket 93 carried by a longitudinal beam 15, and may be operable by means of a hand chain 94 for shifting the pinion 25 into engagement with the gear 95. This last mentioned gear is rigid with the shaft 85. A pinion 86 is mounted on the shaft and is adapted to drive a sprocket chain 87 for rotating a shaft 88. This last mentioned shaft as shown in Fig. 5, is provided with a pinion 89 which meshes with a rack 90 forming part of the shaft 44. Accordingly, whenever the shaft 85 is rotated, the shaft 44 is shifted laterally, thus carrying the sheaves 42 simultaneously, whereby the load engaging cables 40 may be skewed to bring them more accurately into position for engaging a load. In this way, the crane may be positioned on the trackway so that the cables 41 are in registration with the engaging members on a load, and then the cables 40 may be shifted laterally a slight amount to engage the members at the other end of the load without requiring the truck driver to change the position of the truck with relation to the overhead trackway.

The mechanism heretofore described, and the method of operation thereof, has been concerned with a construction wherein a single screw and nut couple is employed for raising all of the cables. This requires a comparatively heavy shaft 30 which carries all of the load. In order, therefore, to decrease the necessity for a large threaded shaft, and at the same time to obtain a construction wherein the load stresses are nearly balanced with relation to the frame, I have shown a modification which comprises opposed screw and nut couples, each of which is adapted to control two of the cables, and each of which is adapted to be driven from the common source of power. This modification is shown in Figs. 10 to 18 wherein the elements which are similar to those indicated in Figs. 1 to 9, bear the same reference characters.

Figure 17:
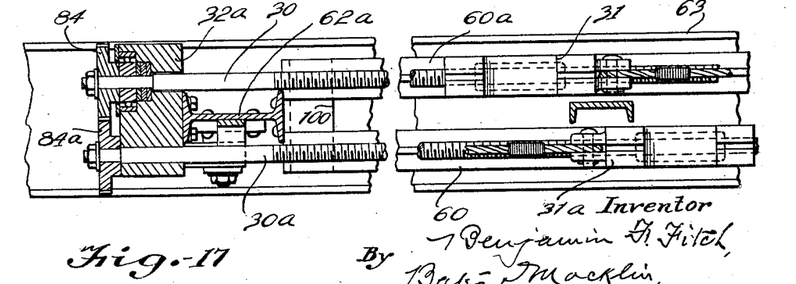

The preferred means for arranging the opposed screw and nut couples is to mount one threaded shaft directly above the other, as indicated in Fig. 17 at 30 and 30$^a$, and to provide gears 84 and 84$^a$ which intermesh and are secured at one end to the respective shafts. The gear 84$^a$ is adapted to be driven by a pinion 83 which in turn may be operated by the hand chain 81. Each threaded shaft is supported so as to be in tension when the load is being raised, or carried by the hoisting cables, and accordingly, the thrust bearing for the shaft 30 is at one end of the frame, while that for the shaft 30$^a$ is at the opposite end of the frame. Each bearing block, as at 32$^a$ and 33$^a$, carries a thrust bearing for one shaft and a plain bearing for the other shaft; these being indicated particularly in Fig. 17, wherein only the block 32$^a$ is shown.

The threaded shafts 30 and 30$^a$ engage carriages 31 and 31$^a$ respectively, which move in opposite directions when the hand chain 81 is operated. Each nut or carriage may be permanently attached to two of the operating cables and in the embodiment shown, the cables 40 are attached to the carriage 31, while the cables 41 are attached to the carriage 31$^a$. The arrangement of sheaves for the cables 40 is substantially the same as illustrated in Fig. 1, except that a lighter shaft may be employed. The cables 41 are preferably arranged to extend over sheaves 43 which are operated in a plane transversely of the main frame. Accordingly, to connect the ends of the cables to the carriage 31$^a$, they are caused to pass from the sheaves 43 over the sheaves 50$^a$ and thence around the sheaves 51$^a$ adjacent the end of the frame opposite the sheaves 51, from whence they extend longitudinally of the threaded shaft and are permanently connected to the carriage.

In order to guide the carriages during longitudinal movement, I have illustrated a pair of guides 60$^a$ and 61$^a$ which correspond to the guides 60 and 61, but which are positioned therebeneath and are attached at opposite ends of the frame to vertical members 100 and 101, respectively. These supporting members in turn are adapted to be carried by a horizontally disposed beam 62$^a$ at one end of the frame, and by a similarly disposed beam 34$^a$ at the opposite end of the frame.

The operation of a crane constructed according to my invention, as shown in Figs. 1 to 9, is as follows: Assuming that a load indicated at 103, in Fig. 2, is carried in a truck beneath the tracks 10 and 11 and substantially at right angles thereto, then the crane is trolleyed over the load by operation of the hand chain 27. Then when the cables 40 and 41 are approximately over the engaging members on the load, the hand chain 80 is operated to lower the cables until they are in position for engagement with the load. The guides 60 and 61 prevent the nut 31 from turning, and bearings heretofore described, resist the stresses set up by the load. After the load has been raised to a sufficient height, it may be held in any desired position by reason of the fact that the threads on the shaft 30 lock against those in the nut 31, thus automatically locking the load without the use of a pawl or other retaining mechanism.

If it is desired to shift the load laterally with relation to the frame prior to depositing it on another truck or on a platform, the pinion 25 is shifted out of engagement with the gear 24 and into engagement with the gear 95 by means of a hand chain 94. Then upon further operation of the hand chain 80, the shafts 85 and 88 are rotated whereupon the transverse shaft 44 is then shifted axially carrying the cables 40 therewith. This lateral movement is accomplished of course, while the crane is held in stationary position.

Where it is desired to employ opposed screw and nut couples for raising the cables, as shown in Figs. 10 to 18, then, when the cables 40 and 41 are brought into engagement with the load, the hand chain 81 is operated, then the gears 84 and 84ª are rotated in opposite directions, whereupon the nuts or carriages 31 and 31ª are moved longitudinally of the frame and in opposite directions. This operates all the cables simultaneously, whereupon only half the load is carried by each threaded shaft. The mechanism for shifting the load laterally or skewing it, as well as the mechanism for moving the crane along the trackways, is the same as that illustrated in Figs. 1 to 9, and is operable in the manner heretofore described.

While I have illustrated my invention as embodied in a duplex crane with a pair of screw and nut couples on separate shafts, it is obvious that the same result may be accomplished and still be in the spirit of my invention if a single shaft having right and left hand threads thereon is caused to operate two carriages, each of which is connected to half the number of cables. This construction may be satisfactory where the lift required is small, such as raising a container from an automobile body, and placing it upon a platform and vice versa.

From the foregoing description, it will be seen that my invention provides a crane which may be constructed in such manner that very little head room is required for the operation thereof, and that the entire hoisting apparatus may be contained within the depth of the frame beams. This crane may be used in existing warehouses and freight stations without requiring extensive shoring and bracing, and without reconstructing the pavement or streets adjacent the platforms, to provide truck runways for centering the load with relation to the hoisting cables.

Having thus described my invention, I claim:

1. In a crane, the combination of a frame, a rotatable screw therein, a traveling nut mounted on the screw, a plurality of load raising cables anchored to the nut and all leading therefrom in one direction and extending continuously from the nut to the load, sheaves over which the cables pass between the nut and load, a thrust bearing for that end of the screw which is on the side of the nut opposite to the cables, whereby the screw between the nut and bearing is under tension while the portion of the screw on the other side of the nut is free from thrust at all times, and means for rotating the screw.

2. In a crane, the combination with a frame arranged in the form of a rectangle, a threaded shaft carried by the frame adjacent the midportion thereof, means for rotating the shaft, said shaft being under tension throughout the load supporting portion thereof, a block comprising a nut in threaded engagement with said shaft, cables having one end thereof attached to the nut, sheaves for leading the cables outwardly towards the sides of the frame, and other sheaves adjacent to the sides of the frame for leading the cables downwardly to permit engagement with a load at the four points.

3. In a crane, the combination with a horizontal frame, of four cables carried thereby and disposed adjacent the four corners of a rectangle, a screw and nut couple operable in a horizontal plane and carried by the frame adjacent the midportion thereof, said couple being operatively connected with the cables for raising and lowering all of them as a unit, means adjacent the same end of the frame for directing all four cables outwardly after which they pass downwardly whereby the nut may move substantially the entire length of the shaft, and mechanism carried by the frame at the end opposite said means for rotating one member of the couple in such direction that the load carrying portion of the screw is under tension during the raising of the load.

4. In a crane, the combination with a frame, of a screw and nut couple mounted thereon, the screw being rotatable and the nut being arranged to travel along the screw, means for preventing axial shifting of said screw with reference to the frame, four cables, each having one end thereof attached to said nut, mechanism on said frame for rotating the screw, two pairs of horizontally disposed sheaves adjacent one end of the path of travel of said nut for leading the cables outwardly from the couple, and four vertically disposed sheaves mounted on the frame and adjacent the corners of the rectangle, there being two of said vertically disposed sheaves on each side of the couple and means carried adjacent the end of said cables for engaging a load, and said mechanism being mounted upon the frame on the end opposite the horizontally disposed sheaves, whereby the load lifting portion of the screw will be placed under tension when loaded.

In testimony whereof, I hereunto affix my signature.

BENJAMIN F. FITCH.